United States Patent [19]

Cicatelli

[11] 4,014,041

[45] Mar. 22, 1977

[54] CASSETTE RECORDING AND HANDLING DEVICE

[75] Inventor: Rodolfo Cicatelli, Rome, Italy

[73] Assignee: Autovox S.p.A., Roma, Italy

[22] Filed: Apr. 1, 1975

[21] Appl. No.: 564,204

[30] Foreign Application Priority Data

Apr. 5, 1974 Italy .................................. 50170/74

[52] U.S. Cl. ................................. 360/96; 242/199
[51] Int. Cl.² .................. G11B 15/10; G11B 15/24
[58] Field of Search ................. 360/96, 93, 94, 83, 360/71, 74; 242/197–200

[56] References Cited

UNITED STATES PATENTS

| | | | |
|---|---|---|---|
| 3,524,651 | 8/1970 | Ketzer | 360/96 |
| 3,743,299 | 7/1973 | Takashino | 360/96 |
| 3,754,765 | 8/1973 | Tanaka | 360/96 |
| 3,758,121 | 9/1973 | Walsh | 360/96 |
| 3,779,482 | 12/1973 | Chimura | 360/96 |
| 3,781,017 | 12/1973 | Baldwin | 360/96 |
| 3,781,106 | 12/1973 | Benton | 360/96 |
| 3,818,504 | 6/1974 | Schroeder | 360/96 |

Primary Examiner—Alfred H. Eddleman
Attorney, Agent, or Firm—Cushman, Darby & Cushman

[57] ABSTRACT

In a cassette recorder having a frame, a tape transport mechanism operable in fast forward and fast rewind modes in response to a control device therefor, and a cassette handling mechanism mounted in said frame, and a motor driving said tape transport mechanism: a slide member reciprocable on a bridge of said frame between an internal, retracted position and an external, extracted position, said slide having a slot therein and having a front end and a rear end; a spring biasing said slide toward its external position; an arm pivoted in said frame and carrying a recording head, an erase head and a pressure roller of a capstan, said arm also carrying a pivot engaging said slot in said slide to shift said heads and said pressure roller into inoperative positions when the slide is pushed inward into its retracted position and to shift said heads and pressure roller into operative positions when said slide is moved to its extracted position; a handle linked to the front end of said slide and engaging said arm and the control device for the fast forward and rewind modes of said tape transport mechanism.

5 Claims, 17 Drawing Figures

CASSETTE RECORDING AND HANDLING DEVICE

The present invention refers to a cassette recording device and particularly to a cassette recorder which is suitable to be installed in the restricted space of the instrument board of a motor vehicle.

The main object of the invention is to supply a cassette recorder wherein the control operations are reduced to a minimum.

Another object of the invention is to supply a cassette recorder wherein the mere slipping-in of the cassette automatically shifts said cassette recorder into the reproduce mode, while by the actuation of a single control it is thereafter possible to shift the recorder into the recording, fast forward, fast rewind, stop and cassette ejection mode.

Another object of the invention is that of supplying an extremely compact, unexpensive cassette recorder, which is suitable for mass production.

The present cassette recorder comprises a single push-button type control member, which is supported by a reciprocable slide, which is free to perform relative movements with respect to it, which push-button, during its motion in a first direction or towards the exterior of the recorder together with the slide, successively controls cassette positioning means and means which position the recording and erasing heads and the pressure roller into their operating positions; during its movement in the second direction or towards the interior of the recorder it controls, together with the slide, successively means which withdraw the recording and erasing heads and the pressure roller, and actuate cassette lifting and ejecting means; and by a rotatory movement with respect to the slide, starting from the extracted position, it controls means for withdrawing the recording and erasing heads and the pressure roller and means for the fast forward and rewind mode of the tape.

The invention will result clearly from the following description, made with reference to the attached drawings, of one of its possible embodiments, it being understood that said description has to be construed as being purely illustrative and in no way limitative to the invention. In the following disclosure and claims, the directions "right", "left", "clockwise" and "counterclockwise", "top", "bottom", etc. are intended as they appear to the beholder of the figures being discussed.

Figure 1:
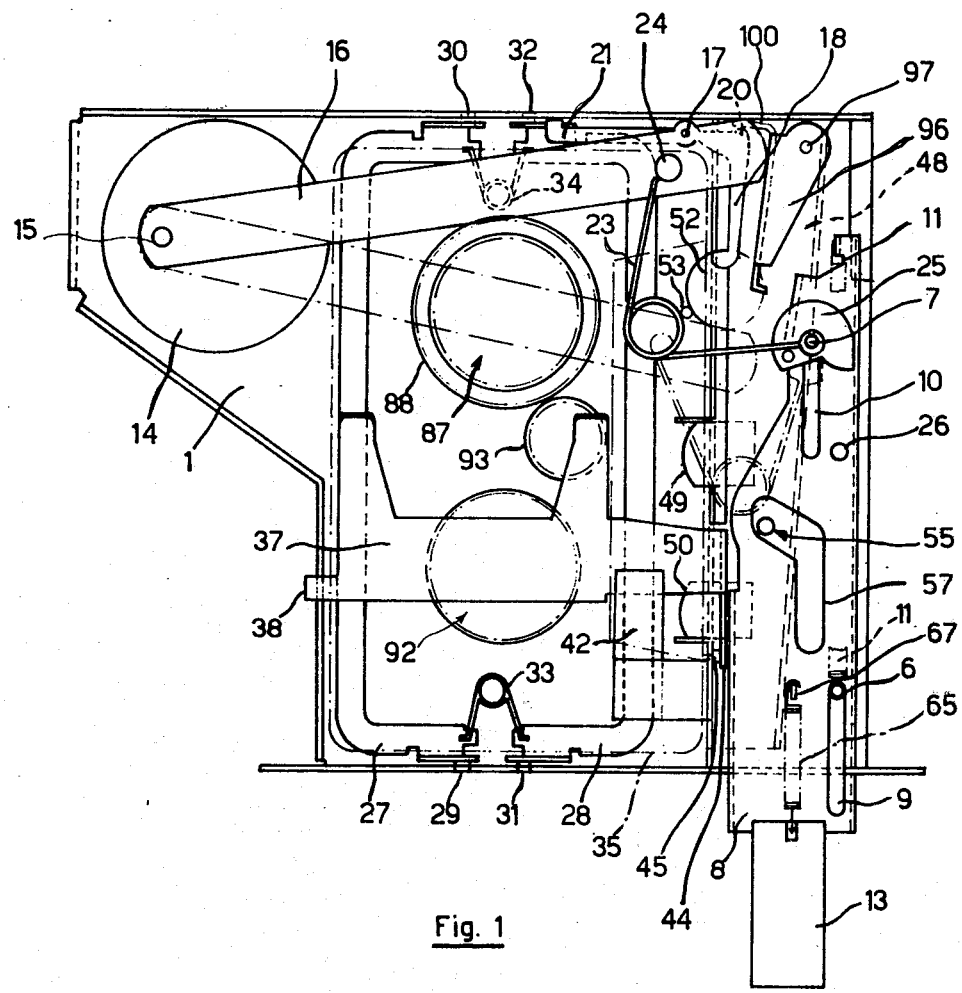
FIG. 1 is a plan view of the embodiment.

With reference to the drawings, wherein the same parts are indicated with the same reference numerals, the cassette recorder comprises a frame 1 having a front flange 2 and a rear flange 3 as well as a left lateral flange 4. A bridge 5 is fastened between flanges 2 and 3. A slide 8 having the shape of an inverted U is fitted with two slots 9 and 10, within which the pivots 6 and 7 engage respectively. Pivots 6 and 7 allow slide 8 to reciprocate between an internal and an external position and guide it in its movement, wherein slide 8 is biased towards its extracted position by a traction spring 11, having a first end fastened to pivot 6 and a second end hooked to a shaped tongue 12 of slide 8.

Figure 4:
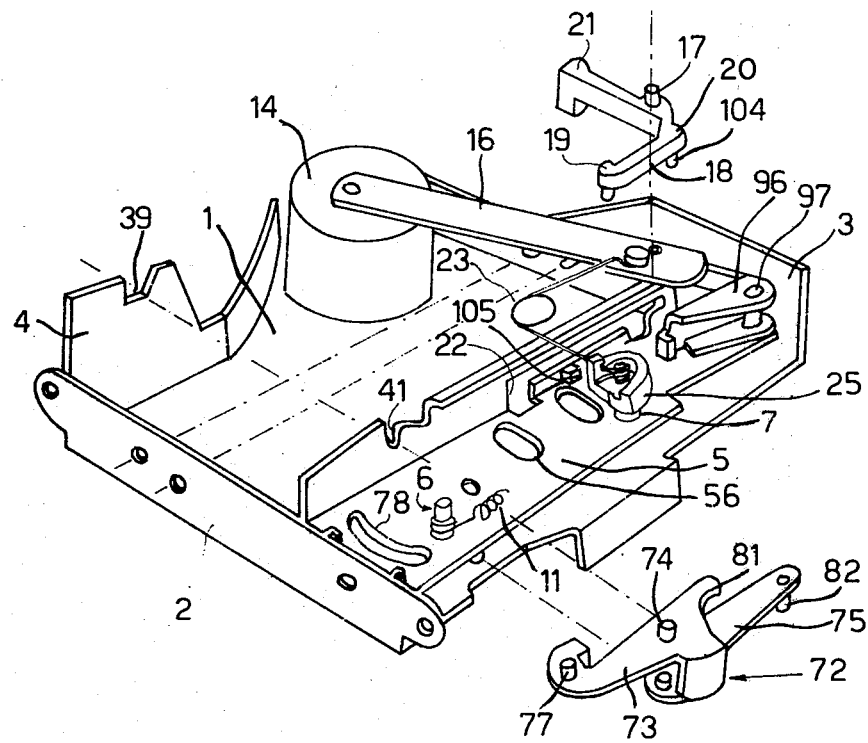
FIG. 4 is an exploded view thereof.

The slide 8 is shifted towards its pushed-in position by a push-button or handle 13. An electric motor 14 is fastened to frame 1 and one end of a lever is fulcrumed at 15 to the motor casing. To the other end of this lever 16 there is fulcrumed at 17 a cassette gripper 18. This gripper 18 (FIG. 4) has a hook-shaped front part 19, a rounded rear part 20 and a lateral arm 21.

The gripper 18 is displaceable within a slot 22 of bridge 5, so that the lever 16 may pass from the position shown in a continuous line to the position shown in a dotted line in FIG. 1 and vice versa, while oscillating around its pivot pin 15.

One end of a bristable spring 23 is formed into an eyelet and is rotatable around a pivot 24 integral with lever 16, while the other end of said spring 23 is connected to a cam 25, which is freely rotatable around said pivot 7. A pin 26 on slide 8 engages said cam 25, as it will be better illustrated in the following.

Figure 2:
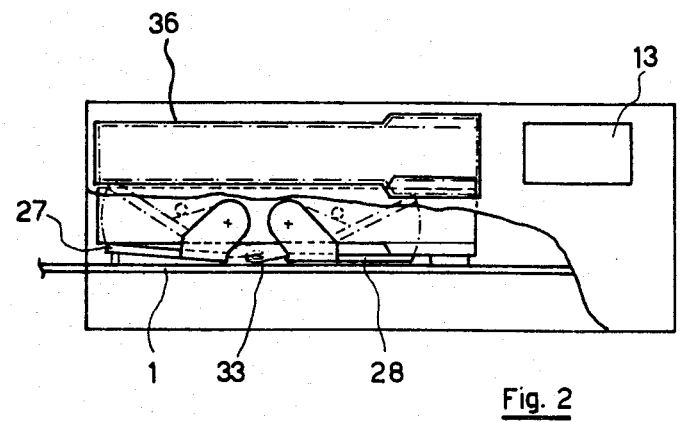
FIG. 2 is a partially sectional front view thereof.
Figure 3:
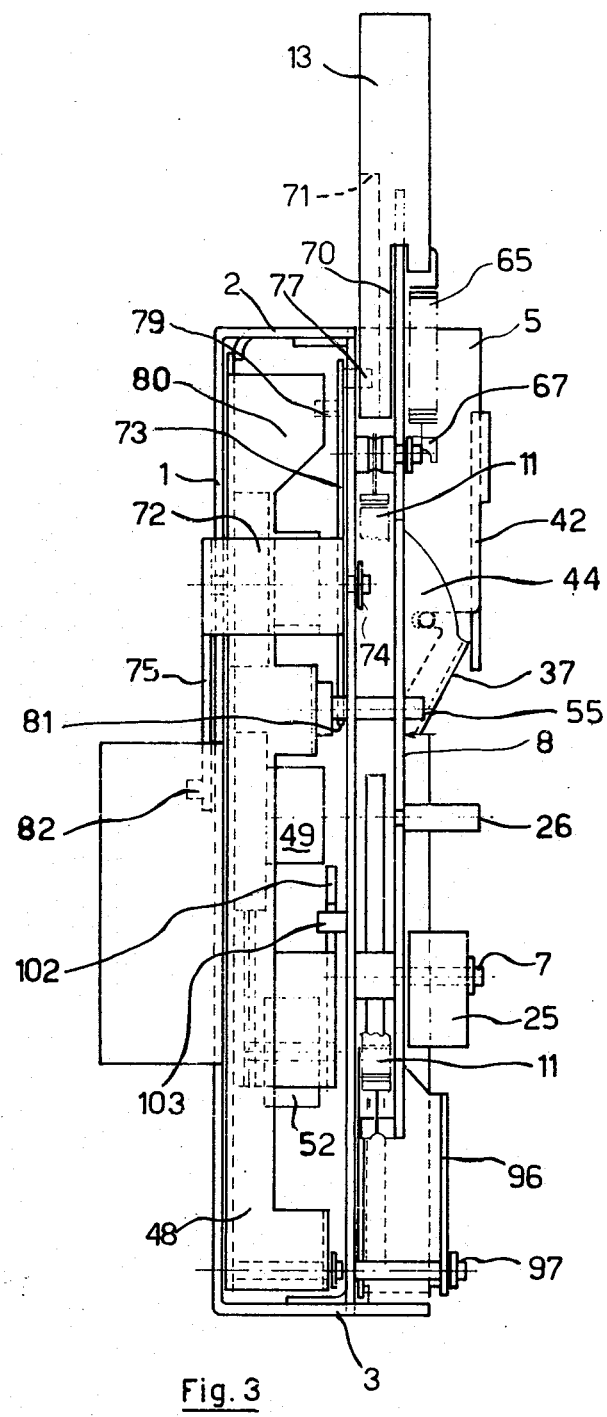
FIG. 3 is a lateral elevational view thereof.
Figure 8:
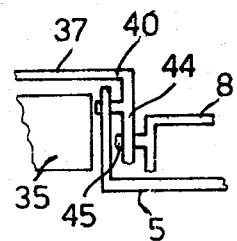
FIG. 8 is a front view of details of FIG. 7.
Figure 9A:
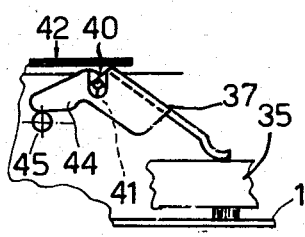
FIGS. 9a and 9b show in a lateral view two positions of details of FIG. 7.
Figure 9B:
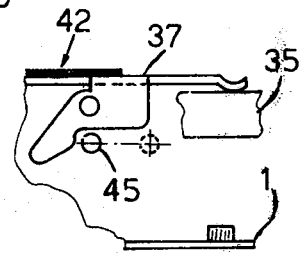

Two C-shaped cross-pieces 27 and 28 which are fulcrumed in 29, 30 and 31, 32 respectively form a known type lifting device and are forced by two springs 33, 34 in the sense which tends to spread apart the points at which the springs are fastened and thus to lift the transversal parts of said cross-pieces 27 and 28 upon which the cassette 35 rests. Said cassette 35 may be inserted into a slot 36 in the front of the cassette recorder (see FIG. 2). A fork-shaped element 37 (FIG. 3) is fitted with an ear 38 (FIGS. 1 and 8), which coacts with a notch 39 of the lateral flange 4 and a pin 40 coacts with a notch 41 in bridge 5 to form a hinge with one degree of freedom against the action of a spring 42. Spring 42 also serves to urge the fork shaped member 36 towards its horizontal position, as better shown in FIG. 9b.

The fork-shaped member 37 is also fitted with a lateral cam surface 44, which coacts with a pin 45 rigid with slide 8. As better shown in FIGS. 9a and 9b, when the slide is shifted towards the left (FIG. 9a) under the action of spring 11, pin 45 forces cam 44 to assume the position shown in FIG. 9a, while simultaneously lowering into its operating position the cassette 35 owing to the rotation of the fork-shaped member 37 and against the action of the springs 33 and 34 and the cassette 35 consequently forces the cross-pieces 27 and 28 to rotate downward.

When the slide is shifted to the right (FIG. 9b), cam 44 is released from pin 45 and the fork-shaped member 37 positions itself horizontally under the action of a spring 42, while the lifting device causes the lifting of the cassette.

Figure 10:
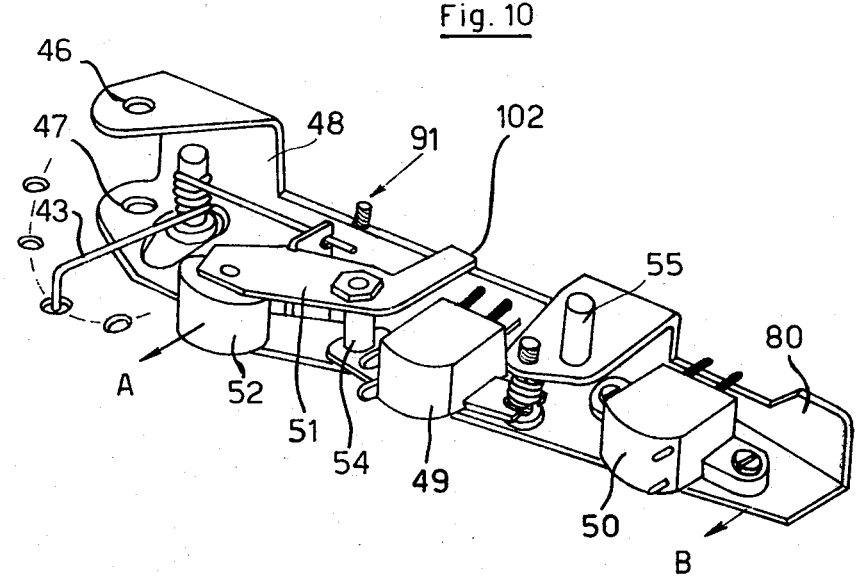
FIG. 10 is a perspective view of the arm which carries the recording and erasing head.
Figure 12:
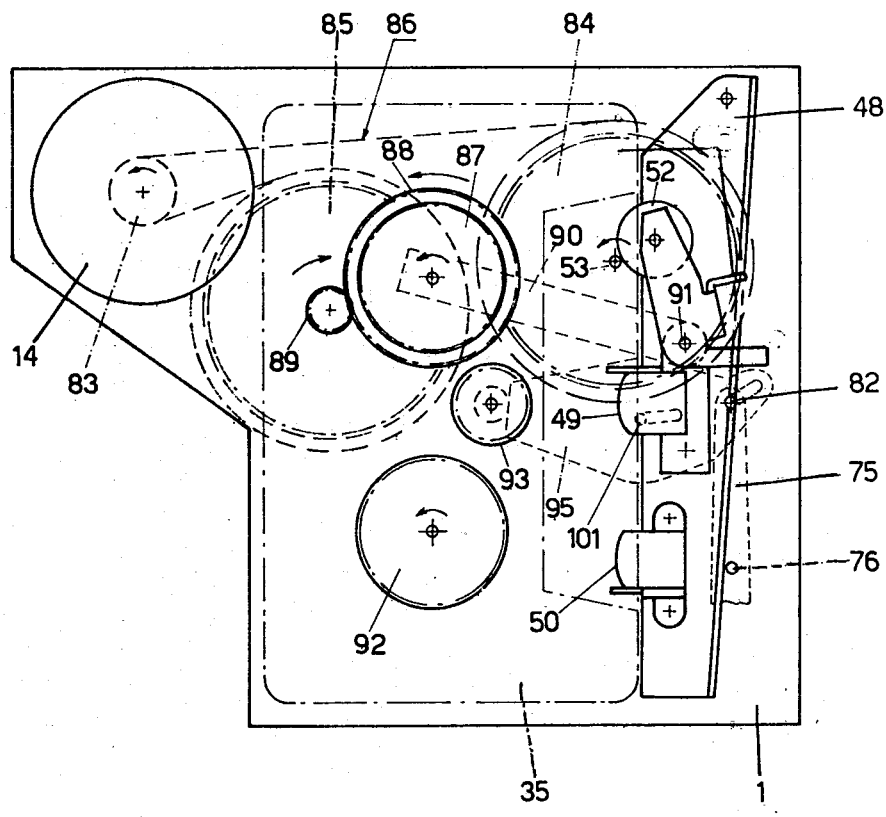
FIG. 12 is a plan view of the tape transport mechanism of the embodiment in the reproducing or recording position.

As shown in FIG. 10, an arm 48 carrying the recording and the erasing head moves between frame 1 and bridge 5 and is fulcrumed around a pivot passing through the holes 46 and 47 of said arm. The recording and reproducing head is indicated at 49 and the erasing head at 50 (see also FIG. 12).

The pressure roller 52, which serves to press the tape against the capstan of the cassette recorder, is freely rotatable in a support 51, which is oscillatable around a hollow pivot 54 and urged against the capstan 53, in the direction of arrow A, by a spring 43.

When the pressure roller 52 contacts the capstan 53, spring 43 urges arm 48 in the direction of arrow B to carry heads 49 and 50 in contact with the tape contained in cassette 35.

Arm 48 has a pivot 55, which passes through a slot 56 of bridge 5 and is inserted into a slot 57 of slide 8, so that when the slide is in its completely extracted position, shown in FIG. 1, arm 48 is free to move in the direction of arrow B (FIG. 10) under the action of spring 43. When the slide is pushed in by the handle 13, pivot 55 is forced to enter the narrowest part of slot 57, and therefore the heads 49 and 50 are withdrawn from the tape.

Figure 5:
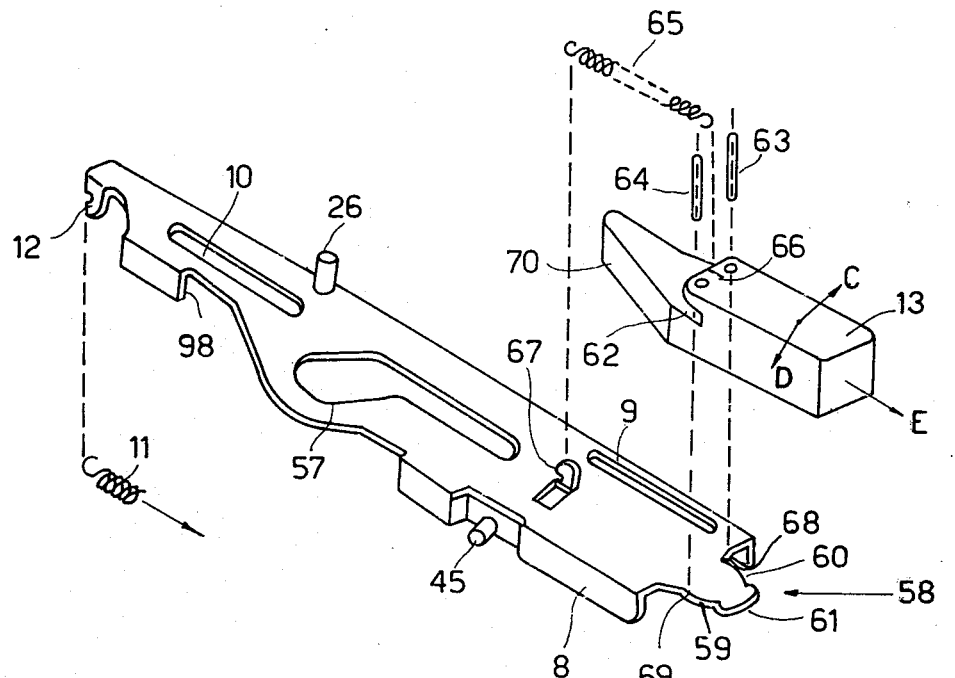
FIG. 5 is an exploded view of its control members.

As better shown in FIG. 5, the front end 58 of the slide 8 has two partial cylindrical surfaces 59 and 60 and a rounded extension 61. Handle 13 has a slot 62, into which is inserted the end 58 of slide 8, while two pivots 63 and 64, which are inserted into two bores of the handle after the latter has been coupled to the slide 8, prevent said handle 13 from being detached from the slide when the distance between their nearest borders is smaller than the rounded extension 61. Therefore the rounded extension 58 is profiled in such a manner as to allow handle 13 a relative movement with respect to slide 8.

Handle 13 is biased towards its rest position with respect to slide 8, as shown in FIG. 1, by a traction spring 65, whose one end is connected at 66 with the handle 13, between the pins 63 and 64, and whose other end is hooked to a tongue 67 made integral with slide 8.

In this rest position of handle 13, the pins 63 and 64 rest against the edges 68 and 69 of slide 8, while the central axes of the pins 63 and 64 coincide with the axes of the imaginary cylinders of which the partial cylindrical surfaces 59 and 60 form a part. Therefore, when the handle 13 is forced in the direction of the arrow C, it will rotate by a given angle around the pin 63, while pin 64 will move around the surface 59 until striking against the rounded extension 61. Vice versa, when the handle 13 is forced in the direction of arrow D, handle 13 will rotate by the same angle but in an opposite sense around pin 64, while pin 63 will move around surface 60 until striking the rounded extension 61; moreover, when the handle 13 is pulled in the direction of the arrow E, both pins 63 and 64 will move forward until striking the rounded extension 61.

Figure 6:
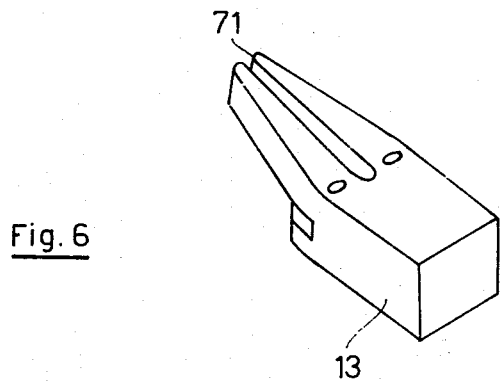
FIG. 6 is a bottom view of its push button.

Handle 13 has an extension 70 with a longitudinal groove 71 (see FIG. 6).

When the handle is coupled to slide 8, this extension 70 is positioned below slide 8 (FIG. 3) and above bridge 5.

Figure 11:
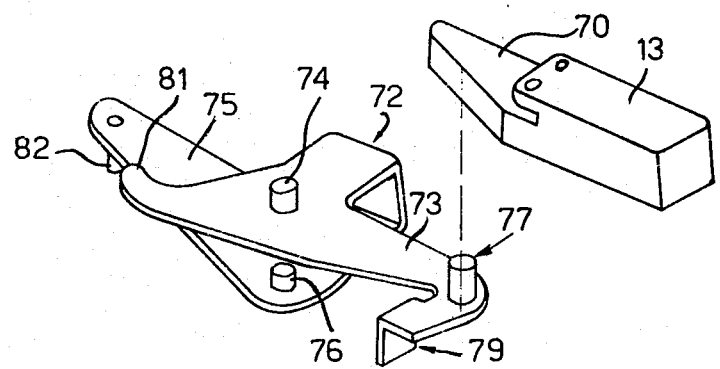
FIG. 11 is a perspective view of a lever for withdrawing said heads and the tape pressure roller.

A twin lever 72 has an upper arm 73 placed below bridge 5 and hinged to it by a pivot 74, and a lower arm 75 placed below frame 1 and hinged to it by a pivot 76 coaxial with pivot 74. The upper arm 73 is fitted with an upward turned actuating pin 77 which traverses the bridge 5 through aperture 78. Pin 77 engages the slot 71 of handle 13, and therefore a rotation of the latter will force the twin lever 72 to rotate around the pivots 74 and 76. The upper arm 73 terminates, at its end adjacent to the pin 77, in a tongue 79 (FIG. 11), cooperating with an ear 80 of arm 48. Correspondingly to its opposite end the upper arm 73 terminates in a hooked portion 81 cooperating with the pivot 55.

The free end of the lower arm carries a downward projecting pivot 82 which is intended to drive parts of the tape transport mechanism. This tape transport mechanism is disclosed in my co-pending application Ser. No. 564,206, filed Apr. 1, 1975, and comprises, in addition to the motor 14, whose shaft ends in a pulley 83, a flywheel 84 and an idler wheel 85, which are driven by an elastic cord 86 from the pulley 83. The capstan 53 is formed by a portion of the flywheel shaft.

A first disk 87, cooperating with the tape receiving reel of cassette 35, serves to wind the tape during the recording and reproducing operations. As better shown in FIG. 12, for this purpose the disk 87 is friction coupled with a gear 88 meshing with a gear 89 rigid with the idler wheel 85.

The friction clutch so formed is controlled by a lever 90, which is suitably fulcrumed so that when one of its ends is lowered by an adjusting screw 91 threaded within the hollow pin 54 (FIG. 10) of the device 51, when the arm 48 is rotated towards the cassette, the friction clutch is inserted and the tape receiving reel starts winding the tape which is fed between the capstan 53 and the pressure roller 52, which pressure roller is also carried into its operating position when the arm 48 is rotated towards the cassette.

Figure 15:
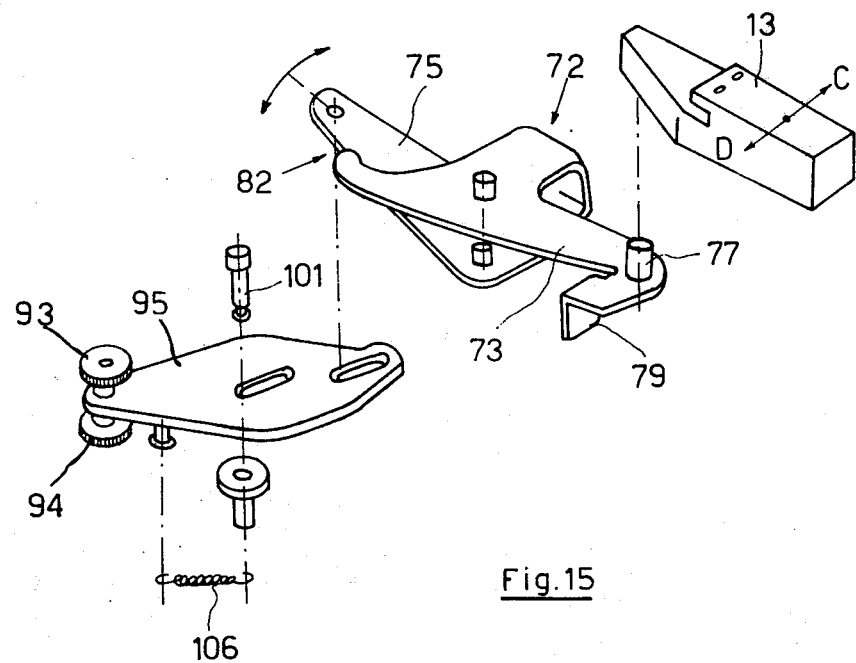
FIG. 15 is a perspective view with exploded parts of the means for the fast forward and fast rewind mode of the tape.

For the fast forward and fast rewind operation, during which the arm 48 must be withdrawn from the cassette, the clutch is automatically released. The motion is transmitted from flywheel 84 to disk 87 and from wheel 85 to a second disk 92 respectively, which cooperates with the tape feed reel of cassette 35 by two coaxial gears 93 and 94, which are rigidly mounted on the same shaft and carried by a flip-over arm 95 (see FIG. 15). The rotation of the lower arm 75 of lever 72 controls therefore the movement of the flip-over arm 95 to complete the desired speed modes.

The operation of the cassette recorder according to the present invention will now be described starting from the stop position, with no cassette inserted. In this situation, the lever 16 and the spring 23 are in the positions marked with the dashed lines in FIG. 1 and slide 8 is prevented from sliding outward by an anchor 96 fulcrumed 97 on bridge 5, which engages a tongue 98 of the slide 8 thereby retaining it. Anchor 96 is resiliently biased towards said latter position. In this manner the anchor 96 permits slide 8 to perform only a short travel from its innermost to its outermost position.

Figure 7:
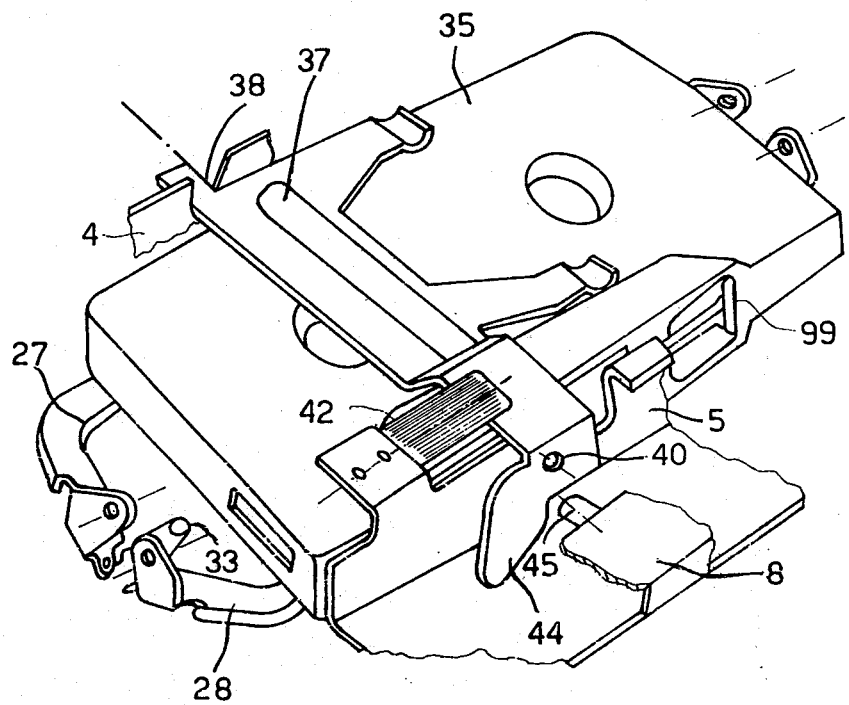
FIG. 7 is a perspective view of the cassette positioning means.

By inserting now a cassette into the slot or receptacle mouth 36, it passes over the two cross-pieces 27 and 28 and under the fork-shaped member 37 until its rim strikes the lateral arm 21 of the cassette gripper 18. As the cassette enters further into the recorder, it causes firstly said gripper to rotate around pin 17 until the front part 19 engages an edge 99 (FIG. 7) of the cassette slot; successively the gripper 18 will cause the lever 16 to rotate anticlockwise (in the sense of FIG. 1) up to the point where the bistable spring 23 reaches its dead point, whereafter the operation becomes automatic.

In fact, spring 23 thrusts the lever 19 towards the position shown by a continuous outline in FIG. 1, and lever 16 entrains the gripper 18 which engages cassette 35, to the point wherein the rear part of the gripper 18 strikes a wing 100 of anchor 96 thereby releasing the slide 8. Under the action of spring 11 the slide 8 moves outward and causes firstly, through its pin 45, the rotation of the fork-shaped member 37 and thereby forces the cassette 35 to move downward into its operating position. With the slide 8 continuing its motion, the pivot 55 of arm 48 penetrates into the widened portion of the slot 57 and therefrom the arm 48 approaches the cassette to the point in which the pivot 55 engages the hooked portion of twin lever 72 and simultaneously the ear 80 of arm 48 engages the tongue 79 of twin lever 72. While approaching the cassette, arm 48 serves the clutch of the transmission mechanism through the screw 91 and carries the pressure roller 52 in its operative position.

At the end of its path, slide 8 actuates a (not shown) microswitch, thereby closing the feed circuit of motor 14, and thus the tape feed and reproducing operation begins.

When it is desired to pass a recording operation, it is sufficient to extract the handle 13, which, in its movement relatively to slide 8, will close a contact which will supply the recording signal to the electronic circuit of the recorder. When the handle 13 is released, spring 65 will restore it into its rest position, without interrupting the recording operation.

When it is desired to switch into the fast forward or fast rewind speed mode, handle 13 will be pushed to the right or to the left respectively, as seen in FIG. 1.

Figure 13:
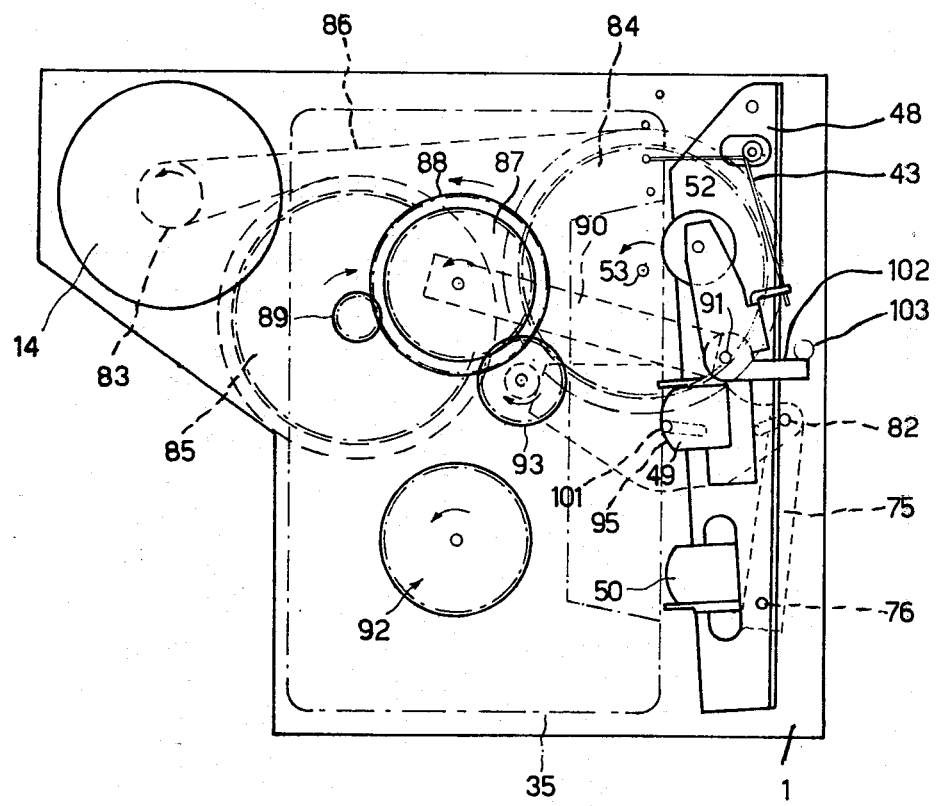
FIG. 13 is a plan view of the tape transport mechanism of the embodiment in its fast forward mode.

When the handle 13 is forced to the right, its groove 71 will force twin lever 72 to rotate clockwise: the hooked portion 81 of the upper arm 73 of twin lever 72 will act upon pivot 55 so as to withdraw arm 48 from the cassette, which causes the release of the clutch, while the pivot 82 of the lower arm 75 forces the flip-over arm 95 to rotate around a pivot 101 (FIG. 13), thereby engaging gears 93 and 94 with the disk 87 and the flywheel 84, respectively. Therefore the tape will be quickly wound upon the receiving reel of the cassette. In order to free the pressure roller 52 without an excessively long excursion of the arm 48, the support 51 of the pressure roller has an ear 102 suitable to strike a pin 103 of the bridge 5. Therefore, when twin lever 72 withdraws arm 48, the ear 102 of the support 51 strikes said pin 103 thereby forcing the support 51 to rotate around its hollow pin 54 in the sense which withdraws the pressure roller from the tape; in this manner, the rectractive motion of the pressure roller is amplified.

When the handle 13 is pushed inward, the slide 8 forces arm 48 to move anticlockwise owing to the action of the slot 57 on pivot 55: in this case, the movement of arm 48 is greater than the travel obtained by twin lever 72, and therefore the movement of the pressure roller must be smaller. The suitable shaping of the head of ear 102 satisfies this requirement.

Figure 14:
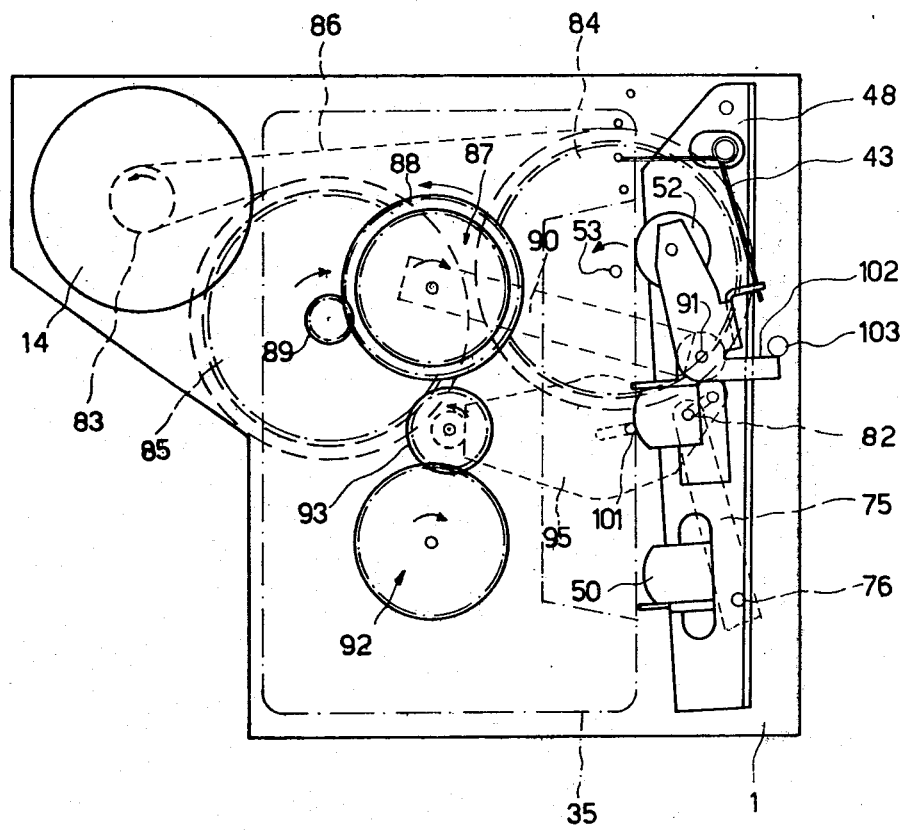
FIG. 14 is a plan view of the tape transport mechanism in the fast rewind mode.

Vice versa, when the handle 13 is shifted to the left, the groove 71 forces twin lever 72 to rotate anticlockwise; the tongue 79 of the upper arm of twin lever 72 acts upon the ear 80 of arm 48, retracting it from the cassette; simultaneously the pin 82 of the lower arm 75 forces flip-over arm to shift, against the action of a spring 106 (FIG. 15) until carrying the gears 93 and 94 to mesh with the disk 92 and the idler wheel 85 respectively (FIG. 14). Therefore the tape of the cassette will be quickly rewound upon the feed reel.

When it is desired to interrupt the playback or the recording operation and to eject the cassette, the handle 13 is pushed completely inside. In this manner slide 8 completes a whole stroke towards the interior of the recorder, whereby the spring 11 is loaded. During a first portion of this stroke (first phase) the current feed to the motor 14 is switched off and the slot 57 coacts with the pivot 55 to retract the arm 48 from the cassette. During a second portion of the stroke (second phase) the pin 45 of the slide 8 releases the lateral cam surface 44 of the fork-shaped member 37, so that the spring 44 causes the fork-shaped member 37 to rotate into a horizontal position, and thereby the cassette 35 is lifted by the cross-pieces 27 and 28, which act as a lifting device under the action of the springs 33 and 34.

In the last portion of the stroke (third phase) of the slide 8, the pin 26 rotates cam 25 anticlockwise (as looking at FIG. 1). This rotation loads the bistable spring 23 and moves the lever 16, which entrains the cassette gripper 18 thereby causing the ejection of the cassette by its lateral arm 21. The movement of the gripper has also the effect that its rear part 20, when moving forward, releases the anchor 96, which assumes, under the action of its spring, the position which is suitable to interfere with the tongue 98 of the slide 8, so as to prevent said slide from performing, once it has been released, an outward move of a stretch longer than that required by the pin 26 to withdraw from the area of interference with the cam 25. Simultaneously the spring 23 will automatically cause the displacement of lever 16 to the position indicated by a dotted line in FIG. 1, in which position a tooth 104 of the cassette gripper 18 strikes a projection 105 of bridge 5 wherefore its front part 19 is disengaged from the cassette. If now the handle 13 is released, the slide assumes the already described stop position and the cassette may easily be extracted by the operator, because it projects sufficiently from the mouth 36.

Figure 16:
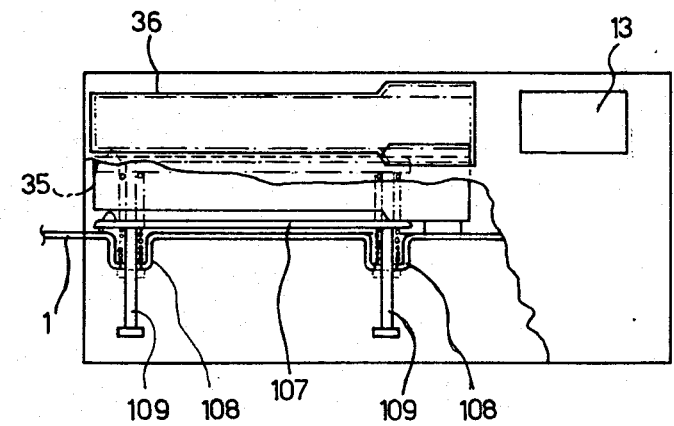
FIG. 16 shows a variant of the cassette positioning means.

FIG. 16 shows a variant of the lifting device, wherein a frame 107 supporting the cassette 35 is biased upward by springs 108 placed around guide pins 109.

It is obvious that many and different variants may be applied by the experts in the art to the above illustrated forms of embodiment of the present invention, without departing from its scope; it is understood that all these variants and changes are encompassed in the concept of the present invention.

What is claimed is:
1. In a cassette recorder having a frame, a tape transport mechanism operable in fast forward and fast rewind modes in response to a control device therefor, and a cassette handling mechanism mounted in said frame, and a motor driving said tape transport mechanism: a slide member reciprocable on a bridge of said frame between an internal, retracted position and an external, extracted position, said slide having a slot therein and having a front end and a rear end; a spring biasing said slide toward its external position; an arm pivoted in said frame and carrying a recording head, an erase head and a pressure roller of a capstan, said arm also carrying a pivot engaging said slot in said slide to shift said heads and said pressure roller into inoperative positions when the slide is pushed inward into its retracted position and to shift said heads and pressure roller into operative positions when said slide is moved to its extracted position; a handle linked to the front end of said slide and engaging said arm and the control device for selecting the fast forward and rewind modes of said tape transport mechanism.

2. In a cassette recorder having a frame, a tape transport mechanism operable in fast forward and fast rewind modes in response to a control device therefore, and a cassette handling mechanism mounted in said frame, and a motor driving said tape transport mechanism: a slide member reciprocable on a bridge of said frame between an internal, retracted position and an external, extracted position, said slide having a slot therein and having a front end and a rear end; a spring biasing said slide toward its external position; an arm pivoted in said frame and carrying a recording head, an erase head and a pressure roller of a capstan, said arm also carrying a pivot engaging said slot in said slide to shift said heads and said pressure roller into inoperative positions when the slide is pushed inward into its retracted position and to shift said heads and pressure roller into operative positions when said slide is moved to its extracted position; a handle linked to the front end of said slide and engaging said arm and the control device for selecting the fast forward and rewind modes of said tape transport mechanism, said recorder further including a fork-shaped element hinged to said frame, one side of said fork-shaped element having a cam surface coacting with a pin rigid with said slide to be rotated when said slide is moved into its extracted position; a gripper support lever pivoted on said frame for rotation and having a free end; a cassette gripper fulcrumed to the free end of said gripper support lever; an anchor fulcrumed to said bridge and resiliently biased towards and engaging said slide when the latter reaches its internal, retracted position and releasing said slide when said gripper is pressed against it; a bistable spring interconnecting said free end of said gripper support lever with a cam fulcrumed on said bridge; crosspieces on said frame resiliently biased for cassette lifting movement; said gripper being arranged such that the insertion of a cassette into said cassette recorder causes the front rim of the cassette to strike said gripper thereby rotating said gripper support lever until said bistable spring thrusts said gripper support lever to a position in which said gripper abuts against said anchor.

3. In a cassette recorder having a frame, a tape transport mechanism operable in fast forward and fast rewind modes in response to a control device therefor, and a cassette handling mechanism mounted in said frame, and a motor driving said tape transport mechanism: a slide member reciprocable on a bridge of said frame between an internal, retracted position and an external, extracted position, said slide having a slot therein and having a front end and a rear end; a spring biasing said slide toward its external position; an arm pivoted in said frame and carrying a recording head, an erase head and a pressure roller of a capstan, said arm also carrying a pivot engaging said slot in said slide to shift said heads and said pressure roller into inoperative positions when the slide is pushed inward into its retracted position and to shift said heads and pressure roller into operative positions when said slide is moved to its extracted position; a handle linked to the front end of said slide and engaging said arm and the control device for selecting the fast forward and rewind modes of said tape transport mechanism, said recorder further including a twin lever hinged to frame, said twin lever having an upper arm forming a two-armed lever and a lower arm forming an elbow lever, one end of said double armed lever being linked through a pin to said handle which is in turn linked to said slide and said one end of said double armed lever also being linked through a tongue depending from said end, to an ear of the arm which carries said heads and said pressure roller; the other end of said two-armed lever coacting with the pivot which engages the slot in said slide; and a pivoted flip-over arm forming a part of said control device for said tape transport mechanism, said arm being swingable between first and second positions representing the fast forward and fast rewind modes of said mechanism, one end of said elbow being linked to said flip-over arm.

4. A cassette recorder according to claim 3, wherein the handle has an extension and a slot penetrating into said handle to receive the front end of said slide, said extension having a groove extending longitudinally therealong to receive the pin which links said double armed lever to said handle, there being two pivots inserted in two vertical bores traversing said handle on opposite sides of said extension, one of said pivots abutting against an edge of the front end of said slide to act as a fulcrum when said handle is rotated in one direction, to swing said flip-over arm toward its rewind position, the other pivot abutting against an opposite edge of the front end of said slide when the handle is rotated in an opposite direction, to swing said flip-over arm toward its fast forward position, both rotations causing the arm which carries said heads and said pressure roller to swing away from the cassette.

5. A cassette recorder according to claim 4, wherein said cassette gripper includes an angle lever having a first arm fulcrumed to said gripper support lever and having a second arm forming a hook to engage one lateral border of a standard cassette when the cassette, during its insertion into said cassette recorder, strikes said first arm of said angle lever.

* * * * *